US000001273H

United States Statutory Invention Registration [19]

[11] Reg. Number: H1273

Novick

[43] Published: Jan. 4, 1994

[54] APPARATUS AND METHOD FOR TRAINING A TECHNICIAN TO DIAGNOSE INTERNAL COMBUSTION ENGINE MALFUNCTIONS

[76] Inventor: John N. Novick, 693 Ocean View Ct., Upland, Calif. 91786

[21] Appl. No.: 808,025

[22] Filed: Dec. 13, 1991

[51] Int. Cl.[5] ..... G09B 19/00

[52] U.S. Cl. ..... 434/224; 434/336; 434/389

[58] Field of Search ..... 434/219, 224, 336, 375, 434/389

[56] References Cited

U.S. PATENT DOCUMENTS 4,623,312 11/1986 Crawford ..... 434/224
4,934,238 7/1990 Gregorio ..... 434/224

*Primary Examiner*—David H. Brown
*Attorney, Agent, or Firm*—Joseph E. Rogers

[57] ABSTRACT

A method for training technicians to diagnose certain induced electronic faults using an internal combustion on a test stand engine capable of having faults inserted into electronic circuits. The faults are inserted into the engine by the instructor using switches concealed from the trainee. While the engine is operating the trainee, using diagnostic equipment, the trainee attempts to locate the electrical fault using a combination of observing symptoms and signal tracing.

6 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR TRAINING A TECHNICIAN TO DIAGNOSE INTERNAL COMBUSTION ENGINE MALFUNCTIONS

FIELD OF THE INVENTION

This invention relates to training devices used to train technicians to diagnose faults and, in particular, relates to the diagnosis of faults in automobile engines.

The internal combustion engine has been a work horse of the transportation industry for many decades. During these decades, engine technology has continued to evolve. Of late, internal combustion engine technology has begun to incorporate to a greater and greater extent the use of analog and digital electronics in both the sensing and controlling of such engines.

The large number of internal combustion and other engines has also had an impact on the air quality throughout the world. In particular, metropolitan areas with large concentrations of people and vehicles, have experienced dramatic increases in pollutant levels over the past several decades. As a result, federal, state and local governments have mandated certain emission standards for vehicles. In order to ensure these emission standards continue to be met over the life of the vehicle, governments also require emission testing at specified frequencies in non-attainment areas.

This combination of emission limits and testing has been successful in reducing the pollutant levels in several areas. Testing identifies vehicles with out of specification exhaust emissions condition which need repair.

Once a vehicle has been identified as being out of specification, there remains the task of determining the cause and locating the problem with the engine. In the past, books, slides, lectures and movies were used for training in automotive repair. While such mechanisms can be extremely helpful in training technicians to actually perform mechanical and electrical repairs, they did not always provide the technician with the manual skills necessary to properly repair the defect.

Educational institutions have attempted to improve training by the use of engines on test stands with either deliberately faulted parts or disconnected wires. Such faulty parts and disconnected wires do result in increasing the students ability to repair the defect. Such defects, however, are easily observed and the methods of detection do not emphasize diagnosis. The defects are not representative of the level of difficulty experienced in diagnosing defects in today's electronically controlled engines.

Today's engines have fewer mechanical and basic components and more often utilize electronic sensors and control circuits to monitor, feedback, and control the operation of the engine. Thus, defects and faults in today's engines are not as easily observable and require diagnosis by evaluation of symptoms and the use of special diagnostic and test equipment.

If such efforts identify a faulty component, the faulty component is most usually replaced since most repair shops are incapable of making repairs to these specialized electronic devices. This further de-emphasizes the need to repair and emphasizes the need to properly diagnose the fault or defect.

Thus, there exists a need for an apparatus and a method that can be used to train technicians to properly diagnose electronic defects and faults and thereby avoiding unnecessary repairs or replacement of expensive parts that are not needed.

SUMMARY OF THE INVENTION

According to the present invention, a training apparatus for simulating faults in an automobile engine is provided. The apparatus comprises:

(a) a set of electronic devices for monitoring and controlling the operation of the automobile engine;

(b) a set of electrical connections for interconnecting certain of the electronic devices to other such electronic devices; and (c) a set of switches for simulating a set of unobservable faults in the electrical connections;

thereby inducing repeatable symptoms whereby a technician observing these symptoms can be trained to determine the location of any one of the set of faults.

A method for training technicians to diagnose certain faults using an apparatus of capable of having unobservable faults inserted into electronic circuits by an instructor is also provided. The method comprises:

(a) inserting an unobservable electrical fault into the electronic circuit of the apparatus;

(b) providing diagnostic equipment to the technician for locating the fault; and (c) allowing the technician to connect test equipment to the apparatus.

DESCRIPTION OF THE PREFERRED EMBODIMENT

In the discussion of the figures, the same numbers will be used throughout to refer to the same or similar components.

Figure 1:
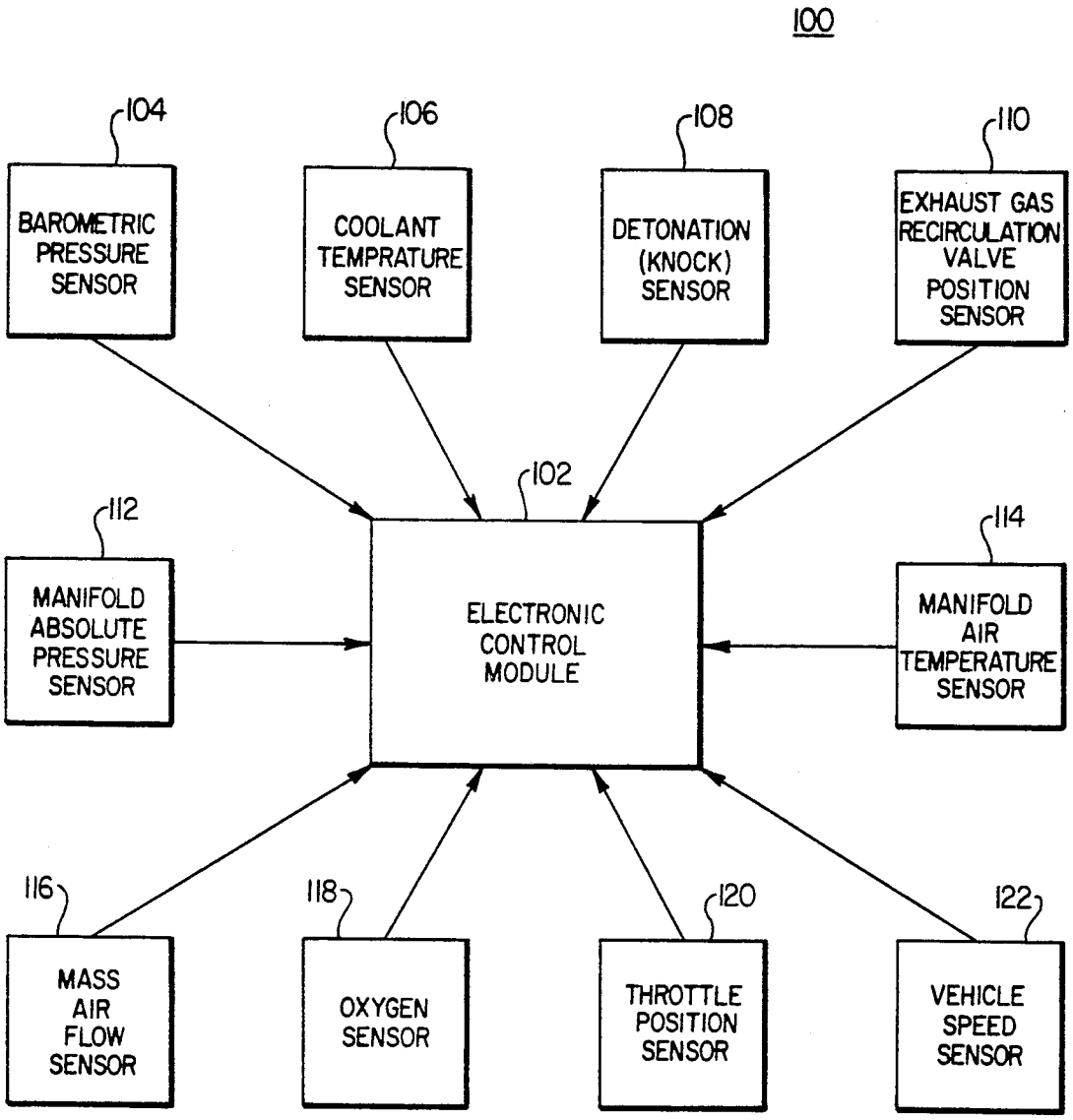
FIG. 1 is a block diagram of a typical engine sensor system for a typical internal combustion engine.

In FIG. 1, there is shown a block diagram of engine sensor circuit. Engine sensor system 100 is typical of several sensor systems well known in the art, for example, the General Motors 2.8 liter V6 used on the 1988 Buick Century. Engine sensor system 100 includes an electronic control module 102 to which all sensors are electrically connected. Barometric pressure sensor 104 is a pressure sensor which is well known in the art. Sensor 104 senses changes in barometric pressure caused by changes in weather and elevation and is electrically connected to electronic control module 102.

Coolant temperature sensor 106 is, for example, a thermistor or resistance temperature detector or any one of many other similar devices which are well known in the art. Sensor 106 is located in the engine cooling system and senses changes in operating temperature of the engine. Coolant temperature sensor 106 is also electrically connected to electronic control module 102.

Detonation (knock) sensor 108 is anyone of a number of motion detectors which are well known in the art and is used to detect engine knock and is electrically connected to electronic control module 102.

Exhaust gas recirculation valve position sensor 110 is a, for example, mechanically variable resistor moved by the action of the exhaust gas recirculation valve or any one of a number of such devices which are well known in the art. The exhaust gas recirculation valve position sensor 110 is electrically connected to the electronic control module 102.

Manifold absolute pressure sensor 112 is also a pressure sensor which is well known in the art. It provides an indication of engine manifold pressure (vacuum). Manifold air temperature sensor 114 is, for example, a thermistor or resistance temperature detector or any one of many other similar devices which are well known in the art. It senses the intake air temperature. Manifold air temperature sensor 112 is electrically connected to electronic control module 102.

Mass air flow sensor 116 is electrically connected to electronic control module 102 and can be any of several types which are well known in the art. For example, mass air flow sensor 116 utilize ultrasonic waves, or a hot wire being cooled by the air flow, or a vain type air flow meter.

Oxygen sensor 108 can be any one of a number of devices known in the art. Sensor 108 measures the amount of oxygen in a vehicle exhaust and is electrically connected to electronic control module 102.

Throttle position sensor 120 is a mechanical, variable resistor mounted to the throttle shaft or other similar device known in the art and is electrically connected to electronic control module 102.

Vehicle speed sensor 122 converts the mechanical action of the speed of the vehicle to a variable voltage and can be anyone of a number devices which are well known in the art. It is electrically connected to electronic control module 102.

Figure 2:
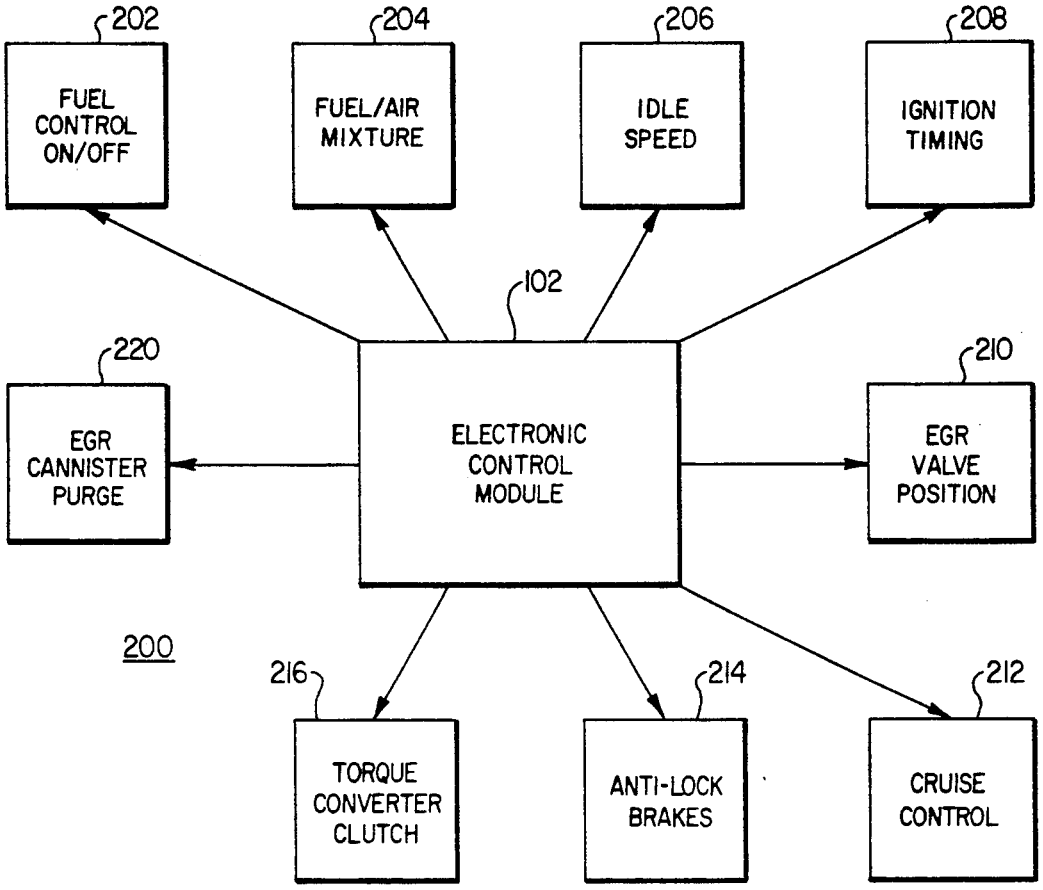
FIG. 2 is a block diagram of a typical engine control system for a typical internal combustion engine.

In FIG. 2, there is shown a typical engine control system which is well known in the art and is similar to that which is employed on the 2.8 liter GM V6 1988 Buick Century. Engine control system 200 receives control signals from the electronic control module 102. The controlled components include a fuel control system 202 well known in the art. Fuel system 202 shuts off or turns on the fuel supply and is electrically connected to electronic control module 102.

Fuel air/mixture controller 204 is any one of a number of devices well known in the art. It is used to adjust the leanness and richness of the engine and is electrically connected to electronic control module 102.

Idle speed controller 206 is also electrically connected to electronic control module 102. Ignition timing controller 208, also electrically connected to electronic control module 102 provides for the timing of electric pulses sent to spark plugs. Exhaust gas recirculation valve position controller 210 is electrically connected to electronic control module 102 and provides repositioning of the exhaust gas recirculation valve by any one of several methods which are well known in the art including the use of a solenoid.

Cruise control controller 212 is electrically connected to electronic control module 102 and provides automatic acceleration, speed control and deceleration as is well known in the art.

Anti-lock brake control system is electrically connected to electronic control system 102 and provides uniform braking as is well known in the art. Torque converter clutch control 216 is electrically connected to electronic control module 102 and provides inputs to the automatic transmission as is well known in the art. Canister purge control system 220 is also electrically connected to electronic control module 102 and provides purging for the evaporative emissions system valve canister as is well known in the art.

An engine having systems similar to those described above is mounted on a suitable test stand and is capable of normal operation. It is like the production engines on vehicles to be tested by trainees in all respects except that it has a switchbox (not shown) having a series switches which are concealed from the view of the trainee.

Figure 3:
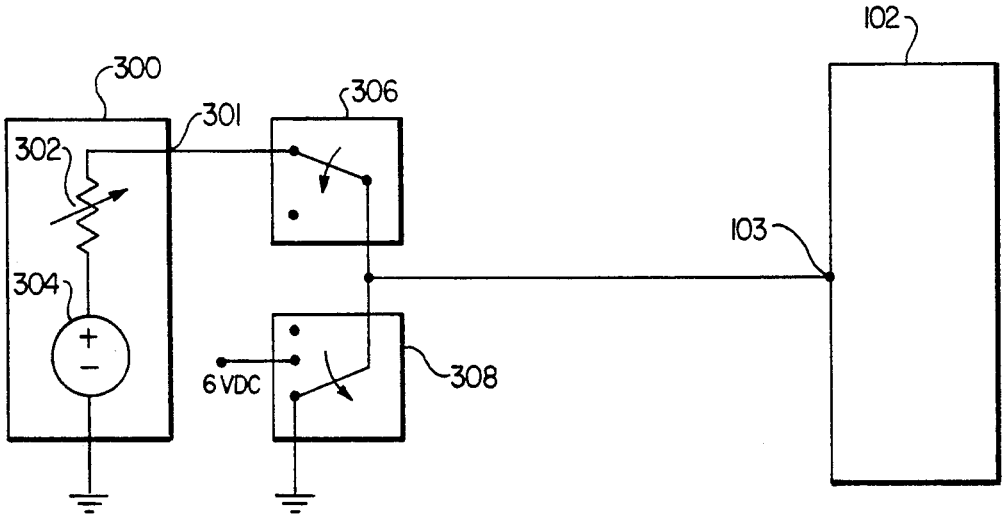
FIG. 3 is a schematic diagram showing the interconnection of the circuit model for a typical oxygen sensor to the engine sensor system which employs an embodiment of the present invention.

FIG. 3 shows a circuit employing one of these switches. FIG. 3 shows a circuit model for a typical oxygen sensor used in an internal combustion engine, for example, the engine described above and depicts an embodiment of the present invention. Oxygen sensor 300 creates a voltage signal. This signal can be, for example, from 1 mv to 1 volt. Oxygen sensor 300 is electrically connected through switches 306 and 308 to electronic control module 102 at terminal 103. Switch 306 may be, for example, a two position switch which would allow the signal from oxygen sensor 300 to be either electrically connected to electronic control module 102 or to open the electrical connection. Switch 308 can be, for example, a three position switch allowing a modified input to electronic control module 102 from oxygen sensor 300 to be either an open circuit, a 1 mv DC or some other suitable electrical voltage indicative of a fault or ground.

Figure 4:
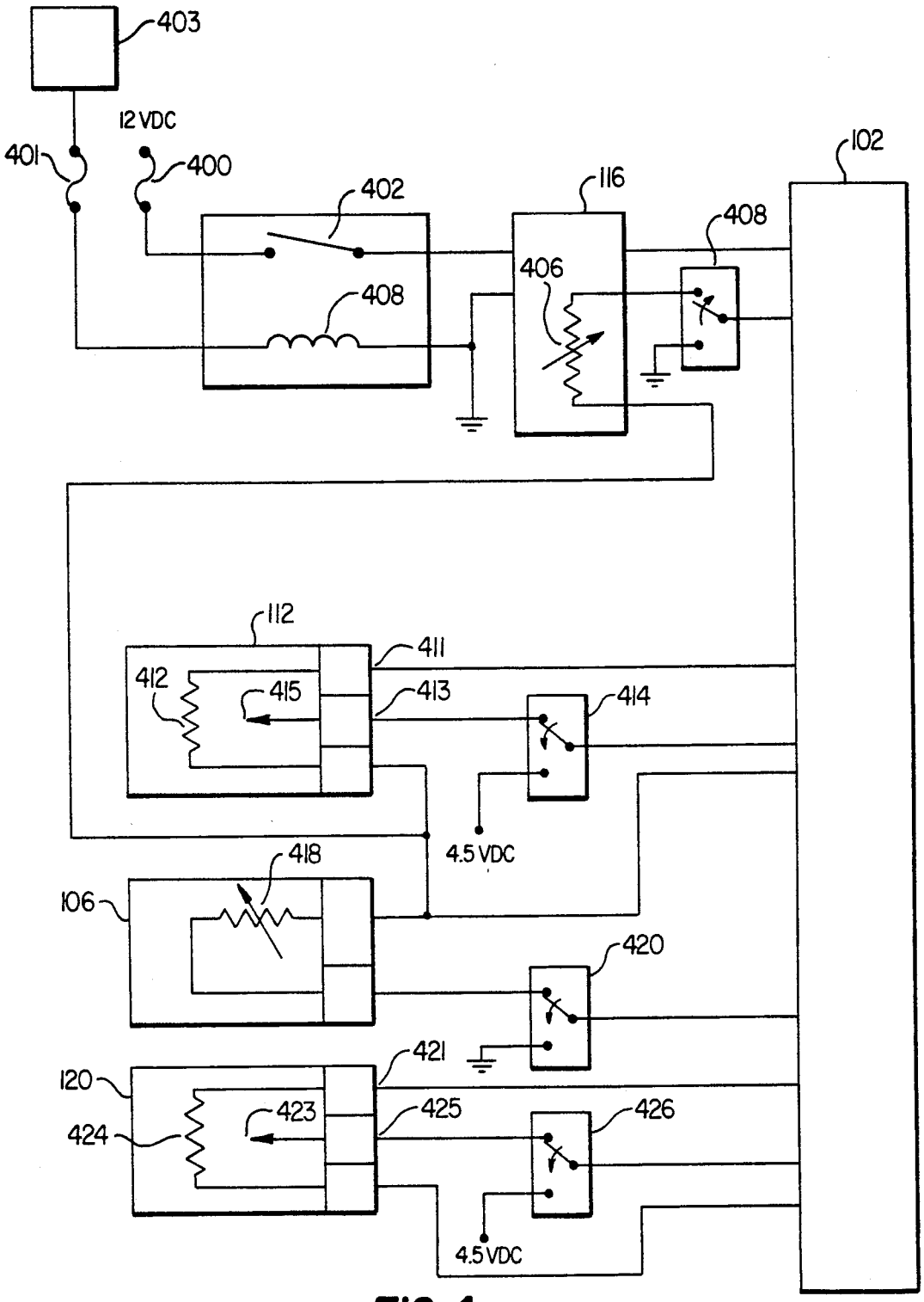
FIG. 4 is a schematic diagram showing the interconnection for circuit models of several other typical sensors to the engine sensor system which employ other embodiments of the present invention.

FIG. 4 shows several other circuits employing such switches. FIG. 4 depicts other circuits which have switches that can alter the operation of several other sensor assemblies. Mass air flow sensor 404 is powered from the engine 12 volt DC power supply, for example, battery or alternator, through mass air flow sensor relay 402. Mass air flow sensor 116 can be modeled as a switch 402 controlled by a coil 408 which is powered from the ignition system 403. When power is supplied in the ignition system 403, a voltage is impressed across coil 408 which closes switch 402, applying 12 VDC to the mass air flow sensor 116 and mass air temperature sensor assembly 114. Sensor assembly 116 can be modeled as a variable resistor 406 and is electrically connected to electronic control module 102 through switch 408. Switch 408 is a two-position switch allowing control of the input to the electronic control module 102 to be either the mass air flow sensor 116 signal or electrical ground.

Manifold air pressure sensor 112 is electrically connected to electronic control module 102. Module 102 provides sensor 112 with a 5 volt reference signal through terminal 411. Sensor 112 output is provided to electronic control module 102 through switch 414. Sensor 112 output is a differential voltage resulting from the mechanical motion of contact 415 against resistor 412. The differential voltage is applied to the input of electronic control module 102 through switch 414. Switch 414 is a three position switch can provide the electronic control module 102 with either the actual manifold air pressure sensor signal, or an open or a constant reference voltage, for example, 4.5 volts DC.

Coolant temperature sensor 106 can be modeled by a variable resistor 418. Coolant temperature sensor 106 provides a signal to electronic control module 102 through switch 420. Switch 420 is, for example, a two position switch which allows the input to electronic control module 102 to be either the coolant temperature sensor 106 output or ground.

Throttle position sensor 120 receives a 5 volt DC reference signal from electronic control module 102 through terminal 421. Contact 423 slides against resistor 424 to produce a differential voltage output at terminal 425. The output at terminal 425 is electrically connected to electronic control module 102 through switch 426. Switch 426 is a three position switch which permits connecting electronic control module throttle position sensor input to either the throttle position sensor output or a 4.5 VDC reference or similar voltage suitable for simulating a fault in sensor 120, or electrically opens the circuit.

In operation, the sensors shown on FIG. 1 provide input signals to electronic control module 102 which, in turn, directs the operation of the various components of engine control system 200. Referring to FIG. 3, oxygen sensor 118 measures the amount of oxygen in a vehicle's exhaust. Sensor 118 generates an output voltage which is ordinarily provided to the input of electronic control module 102. The amount of oxygen in vehicle exhaust, is indicative of the leanness or richness of the fuel/air mixture provided to the engine. As a result of the input signal from sensor 118, electronic control module 102 generates an output signal to the fuel, air/mixture controller 204. Controller 204 adjusts the fuel/air mixture to achieve the proper ratio. For example, if the oxygen sensor output were high, for example, 0.9 millivolts, this would indicate a high fuel to air mixture ratio while a low voltage output, for example, 0.1 millivolts would indicate a lean mixture. Sensor 118 is tested during engine operation while the sensor is at its normal operating temperature of, for example, 600 degrees fahrenheit.

Figure 5:
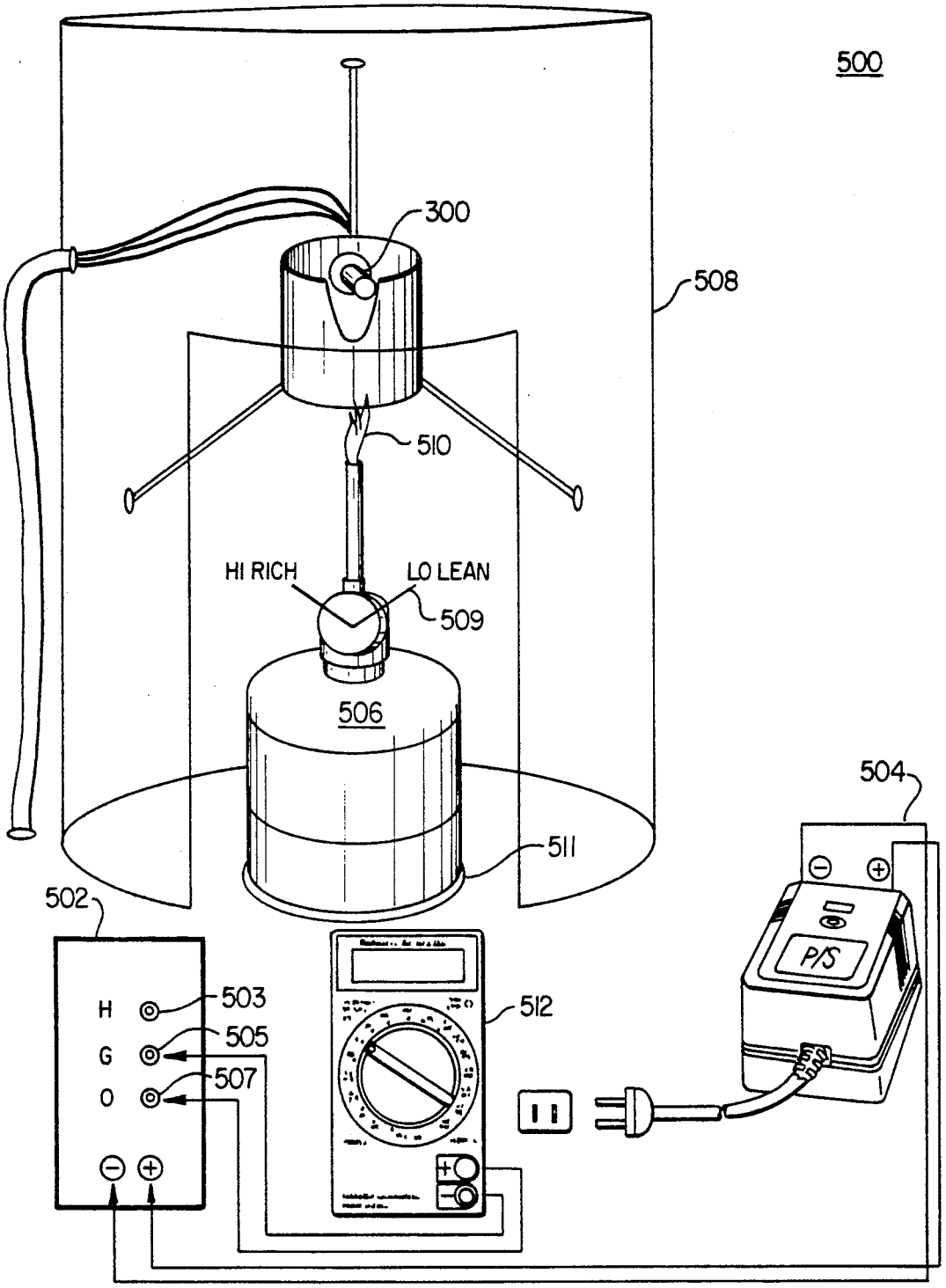
FIG. 5 depicts an experimental breadboard for an oxygen sensor.

In order to familiarize trainee with sensor operation, the sensors shown on FIG. 1 are placed individually and separately on breadboards. FIG. 5 depicts an example sensor breadboard for an oxygen sensor 300. Oxygen sensor 300 is mounted on shield 508 and is electrically connected to terminal board 502. Jacks 503, 505 and 507 are mounted on terminal board 502 and electrically connected to oxygen sensor 300. Propane torch 506 is physically mounted such that flame 509 exhausts in the vicinity of oxygen sensor 300. Valve 509 is used to control the flow of propane to flame 510.

In order to demonstrate the sensitivity of oxygen sensor 300 to changes in the propane oxygen in the propane oxygen mixture, the trainee is instructed to connect the digital volt-ohm meter 512 to terminals 505 and 507 as shown in FIG. 5. The trainee is then instructed to light flame 510 and place torch 506 in fixture 511. Trainee is then instructed to set the torch 506 to the richest mixture by adjusting valve 509 to the full-left setting. Trainee is then instructed to wait a specified period of time and then observe the reading on meter 512. Subsequently, trainee is instructed to reposition valve 509 to its full-right setting, wait and observe the reading on meter 512 to observe oxygen sensor 300 response to a lean mixture.

Trainee is instructed to then connect the positive of power supply 504 to the positive of terminal board 502 and to connect the negative lead from power supply 504 to the negative terminal on board 502, to adjust the torch to a rich mixture by turning valve 509 to its full-left position, and to read the voltage from meter 512. In this way, trainee is familiarized with the sensor output as a function of the parameter being sensed in a situation analogous to that of an operating internal combustion engine.

In order to train the technician in the detection and diagnosis of faults in an operating engine, an engine on a test stand (not shown) is equipped with a set of switches. The switches may be mechanical or digital on any other suitable switch known in the art. The switches are used to insert a fault into the engine's electronic central system. For example, referring to FIG. 4, various electrical faults can be inserted into oxygen sensor circuit 300. Before the trainee approaches the engine stand, the instructor positions switches 306 and 308, such that there is no input to electronic control module 102. Such a signal would cause control module 102 to generate a control signal for fuel/air mixture controller 204 that it was too lean, and result the system trying to compensate by making the mixture richer.

The trainee would then observe the operation of the engine and observe that the engine is running too rich. Trainee would then observe the coded signal provided by electronic control module 102 indicating that the fault was in oxygen sensor circuit 300. The trainee must then determine the exact location of the fault to effect the repair.

Using test equipment, for example, a digital volt-ohm meter, as he was instructed to do in the classroom, trainee can trace the signal path in the sensor loop. Trainee could first measure the signal output at terminal 301 to determine whether or not the oxygen sensor was providing an output signal. Then he could take a measurement at input terminal 103 to determine if module 102 was receiving the output signal from the oxygen sensor 118.

In this case, the trainee might think the fault was in sensor 118 itself, because of the code shown on module 102. Tracing the signal would show him that since there is a signal at terminal 301 but no signal at terminal 103 the problem is a loss of electrical continuity between terminals 301 and 103. In the case of the invention, the instructor was able to simulate a fault by changing the position of switch 306. The trainee would then realize that the fault is not in sensor 118, but rather is either in the wiring or connectors between terminals 103 and 301.

Alternatively, the instructor could have placed switch 306 in the open position and switch 308 is placed the 6 volt DC, whereby or other suitable constant voltage would appear at input terminal 103. Module 102 would indicate that there was a fault sensor circuit 300. Again, tracing the signal on the engine would indicate that either there is a short to some other voltage source between terminals 301 and 103 or that oxygen sensor 118 is faulty. Again, by taking a voltage reading at the output of the oxygen sensor and at the input to electronic control module 102, the technician would be able to locate the source of the stray voltage.

Likewise, the instructor can position switches 408, 414, 420, and 426 can be positioned to simulate faults in the mass air flow and mass air temperature sensor 404, manifold air pressure sensor 410, coolant temperature sensor 416, throttle position sensor 422. In each of these cases, switches 408, 414, 420 and 426 provide the ability to insert an electrical fault into the input signal to electronic control module 102. That fault, can be either a short to ground, as in switch 408 and 420, or the providing of a fixed reference voltage as in the case of switches 414 and 426.

While the present apparatus has been shown using a series of mechanical switches, this training apparatus could easily be configured to use some other switching method, for example, computerized or digital or electronic switching.

Having thus described the invention by reference to certain of its preferred embodiments, it is respectfully pointed out that the embodiments described are illustrative rather than limiting and that many variations and modifications are possible within the scope of the present invention. Many such variations and modifications may appear obvious and desirable to those skilled in the art based upon the foregoing description of the preferred embodiment.

Having thus described the invention, we claim:

1. A training apparatus for inducing malfunctions in an automobile engine which has a plurality of electronic devices for monitoring and controlling the operation of the automobile engine which are interconnected by a plurality of electrical connections, comprising:

(a) a plurality of concealed switches electrically connected to at least one of said plurality of electric connections for inserting at least one unobservable simulated fault in at least one of said plurality of electronic devices;

whereby a technician, observing symptoms of the faults in the operation of the automobile engine can determine the location of any one of the plurality of unobservable simulated faults.

2. The apparatus of claim 1 wherein certain of said plurality of switches are manual switches.

3. The apparatus of claim 1 wherein certain of said plurality of switches are electronic.

4. The apparatus of claim 1 wherein said plurality electronic devices further comprise pollution control devices.

5. A method for training automobile technicians to diagnose certain induced electronic faults using an engine capable of having unobservable faults inserted in electronic circuits by the instructor, comprising:

(a) inserting an unobservable electrical fault into an electronic device which is attached to the automobile engine for monitoring and controlling the operation of the automobile engine;

(b) providing diagnostic equipment to the technician for locating the fault;

(c) allowing the technician to connect diagnostic equipment to the engine;

thereby allowing the technician to diagnose and locate the flaw.

6. The method of claim 5, further comprising the steps of:

(a) providing a plurality of sensors used in sensing the operating parameters of an automobile engine;

(b) providing a means for controlling one of the operating parameters being sensed by one of said plurality of sensors;

(c) providing the technician with test equipment for measuring the output of said one of said plurality of sensors;

(d) allowing the technician to connect the test equipment to said one of said plurality of said sensors;

thereby allowing the technician the opportunity observe the effect of engine operating parameter changes on each of said plurality of said sensors.

* * * * *